United States Patent [19]

Seki et al.

[11] Patent Number: 5,596,241
[45] Date of Patent: Jan. 21, 1997

[54] VIBRATION WAVE DRIVEN LINEAR-MOTOR OR PRINTER

[75] Inventors: Hiroyuki Seki, Urawa; Yoshifumi Nishimoto; Hideki Tanaka, both of Yokohama; Toshiaki Harada, Kawasaki; Atsushi Kimura, Yokohama; Yoshitaka Okamura, Machida; Shinji Yamamoto, Tokyo, all of Japan

[73] Assignee: Canon Kabushiki Kaisha, Tokyo, Japan

[21] Appl. No.: 534,887

[22] Filed: Sep. 27, 1995

Related U.S. Application Data

[63] Continuation of Ser. No. 182,395, Jan. 18, 1994, abandoned.

[30] Foreign Application Priority Data

Jan. 18, 1993 [JP] Japan ................................. 5-005689
Mar. 16, 1993 [JP] Japan ................................. 5-055822

[51] Int. Cl.⁶ ............................................. H01L 41/08
[52] U.S. Cl. ......................................................... 310/323
[58] Field of Search ................................... 310/323, 328

[56] References Cited

U.S. PATENT DOCUMENTS 4,672,256  6/1987  Okuno et al. ........................... 310/323
4,752,711  6/1988  Tsukimoto et al. ..................... 310/323
5,128,580  7/1992  Maeno et al. ........................... 310/323
5,140,214  8/1992  Kimura et al. .......................... 310/323
5,157,300 10/1992  Kataoka .................................. 310/323
5,180,941  1/1993  Seki et al. ............................... 310/323
5,192,890  3/1993  Kimura et al. .......................... 310/323
5,241,234  8/1993  Seki et al. ............................... 310/323
5,285,134  2/1994  Kataoka .................................. 310/323

FOREIGN PATENT DOCUMENTS 0575080 12/1993 European Pat. Off. ............... 310/323
0117669  5/1989 Japan .................................... 310/323
40-6225552  8/1994 Japan .................................... 310/323

*Primary Examiner*—Mark O. Budd
*Attorney, Agent, or Firm*—Fitzpatrick, Cella, Harper & Scinto

[57] ABSTRACT

First and second guide means are provided to both a movable member which moves together with a vibration member, which is in press contact with a rail-shaped stator, and the rail-shaped stator. The first and second guide means have different functions: the first guide means restricts the degree of freedom of the movable member, and the second guide means receives a total compression counterforce of the vibration member.

9 Claims, 5 Drawing Sheets

VIBRATION WAVE DRIVEN LINEAR-MOTOR OR PRINTER

This application is a continuation of application Ser. No. 08/182,395 filed Jan. 18, 1994, which is now abandoned.

BACKGROUND OF THE INVENTION

1. Field of the Invention

The present invention relates to a vibration wave driven motor and, more particularly, to a vibration wave driven linear motor in which an elastic member, in which a travelling wave is formed, is pressed against a rail-shaped stator, and the elastic member is moved along the rail-shaped stator, and a printer utilizing the vibration wave driven linear motor.

2. Related Background Art

As a conventional vibration wave driven motor of this type, a motor shown in FIGS. 7 and 8 is known.

An elliptic elastic member 1 consists of a metal material having a projection 1a on its sliding surface side. A piezoelectric element 2 is joined to the upper surface of the elastic member 1 to form a vibration member. A travelling vibration wave is formed by applying an AC voltage to the piezoelectric element 2. A description of the generation principle of the travelling vibration wave and the structure of the piezoelectric element 2 will be omitted since they are known to those who are skilled in the art. When AC voltages having a 90° temporal phase difference are applied to two driving piezoelectric element groups, which are positionally shifted by 90°, of the piezoelectric element, a travelling vibration wave is formed. A rail-shaped stator 8 is in frictional contact with the elastic member 1. The stator 8 is fixed to a bottom plate 10 of a motor case, and is maintained in contact with the elastic member 1 by a compression spring 3 via a vibration insulating material (e.g., felt) 5. A planar support plate 6 is fixed to the elastic member 1, and its central portion is fixed by a block-shaped support member 7, thus supporting the elastic member 1.

The elastic member 1 is supported by a base 4 via the support plate 6 and the support member 7, and the base 4 is supported by restricting members 9 each of which restricts displacements of the base 4 other than that in a prospective direction $B_Y$.

When a travelling vibration wave is formed in the elastic member 1, the elastic member 1 moves along the rail-shaped stator 8 by a frictional force between the rail-shaped stator 8 and the elastic member 1, and the base 4 and other members 3, 5, 6, and 7 move in the direction $B_Y$ along the restricting members 9 upon movement of the elastic member 1. In this case, the generated frictional driving force acts on a portion of the elastic member 1, and this portion is shifted from the support portion. For this reason, a moment acts on the elastic member 1, and the elastic member 1 is liable to shift in the directions $B_X$ and $B_Y$.

The support plate 6 has an X-shape, as shown in FIG. 9, and the four distal ends thereof are firmly joined to the inner side surface of the elastic member 1 by, e.g., spot welding. The central portion of the support plate 6 is firmly clamped by the support member 7, and the support member 7 is fixed to the base 4. For this reason, even when the moment acts on the elastic member 1, the elastic member 1 can smoothly linearly move together with the base 4 without rotating or cluttering.

Since this motor can perform position control in intermittent driving with high precision, it is proposed to use the motor as a motor for driving a print head in a known bubble-jet printer. A print head is mounted on a carriage (not shown) attached to the base 4, and the motor linearly reciprocally moves the print head.

However, in the above-mentioned prior art, since the rail-shaped stator 8 and the restricting members 9 comprise different members, and these members are elongated in the direction $B_Y$, the rail and the restricting members considerably deform, and it is difficult to attain high flatnesses of the rail sliding surface, and the base of the restricting member.

Furthermore, since the bottom plate 10 to which the rail and the restricting member are attached consists of a thin plate, it is susceptible to a large deformation such as a warp. When the restricting members 9 and the rail-shaped stator 8 are attached to this bottom plate, the deformations of these members become worse.

For this reason, the parallel state of these guide surfaces, which guide the base 4, of the restricting members 9 at the two sides is impaired. Upon movement of the base 4 in the direction $B_Y$, the inclination of the base 4 changes locally, and the gap between the rail sliding surface of the rail-shaped stator 8 and the base 4 undesirably changes.

On the other hand, the elastic member 1 is attached to the base 4 via the support plate 6 and the support member 7, and the compression spring 3 is also attached to the base 4. For this reason, when the gap between the rail sliding surface and the base 4 locally changes in the direction $B_Y$, the compression force to be applied to the elastic member 1 varies, and a stable driving force of the motor cannot be obtained. When the inclination of the base 4 locally changes due to the influence of the guide surfaces of the restricting members 9, the vibration member inclines accordingly, and the contact state between the rail sliding surface and the vibration member is impaired, thus deteriorating motor performance.

Furthermore, since the restricting members 9 receive a compression counterforce of the vibration member via the support member 7 for supporting the vibration member, the load resistance received by the base 4 is large in a guide mechanism of a sliding bearing, as shown in FIG. 7, resulting in a decrease in motor output.

For these reasons, a print result by the print head mounted on the base tends to be unclear.

SUMMARY OF THE INVENTION

It is an object of the present invention to provide a vibration wave driven linear motor which can obtain a stable linear driving force.

It is another object of the present invention to provide a bubble-jet printer with high print precision.

Other objects of the present invention will become apparent from the following detailed description of the present invention.

According to one aspect of the present invention, first and second guide means are provided to both a movable member which is moved together with a vibration member, which is in press contact with a rail-shaped stator, and to the rail-shaped stator. The first and second guide means have different functions, so that the first guide means restricts the degree of freedom of the movable member, and the second guide means receives a total compression counterforce of the vibration member. Thus, a variation in compression force on the vibration member, and an unstable contact state of a sliding portion are eliminated, and the resistance of a restricting portion by the compression counterforce on the vibration member can be reduced without being influenced by a deformation, warp, and the like of a bottom plate, thus preventing deterioration of motor performance.

According to another aspect of the present invention, a rail-shaped stator with which a vibration elastic member of a vibration member is in press contact is formed to have a substantially G-shaped cross-section. The elastic member contacts one of two opposing flange portions, and a roller bearing attached to a base, to which the vibration member is fixed, contacts the other opposing flange portion, so that a total compression counterforce on the vibration elastic member is received by the roller bearing.

BRIEF DESCRIPTION OF THE DRAWINGS

FIGS. 2A and 2B are sectional views of FIG. 1, in which FIG. 2A is a sectional view including a roller bearing, and FIG. 2B is a sectional view showing a compression mechanism of a vibration elastic member;

FIGS. 11A and 11B are sectional views of FIG. 10, in which FIG. 11A is a sectional view including a roller bearing, and FIG. 11B is a sectional view showing a compression mechanism of a vibration elastic member;

FIGS. 13A and 13B show a sixth embodiment, in which FIG. 13A is a side view of the sixth embodiment, and FIG. 13B is a sectional view of FIG. 13A.

DESCRIPTION OF THE PREFERRED EMBODIMENTS

Figure 1:
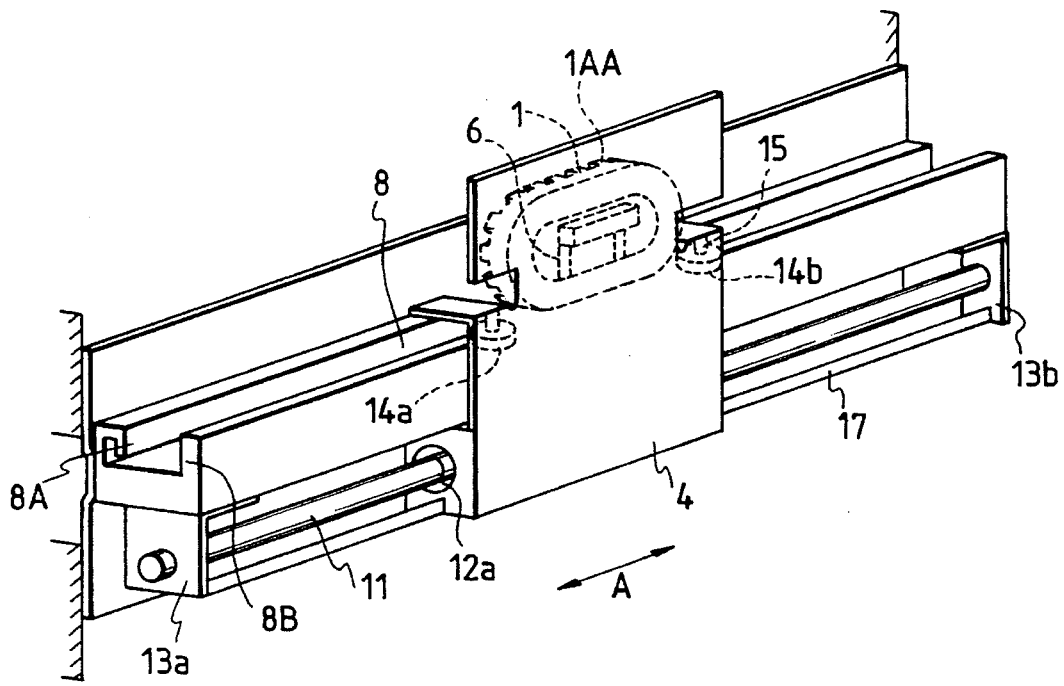
FIG. 1 is a perspective view showing a first embodiment of a vibration wave driven linear motor according to the present invention.
Figure 2A:
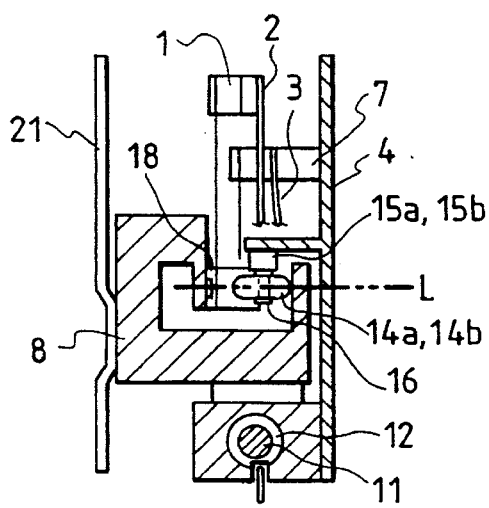
Figure 2B:
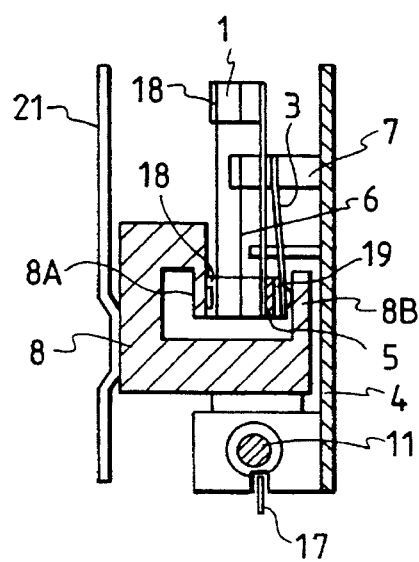

FIG. 1 and FIGS. 2A and 2B are respectively a perspective view and sectional views showing an embodiment wherein a vibration wave driven linear motor according to the present invention is used as a driving source for a carriage of a bubble-jet printer.

Figure 7:
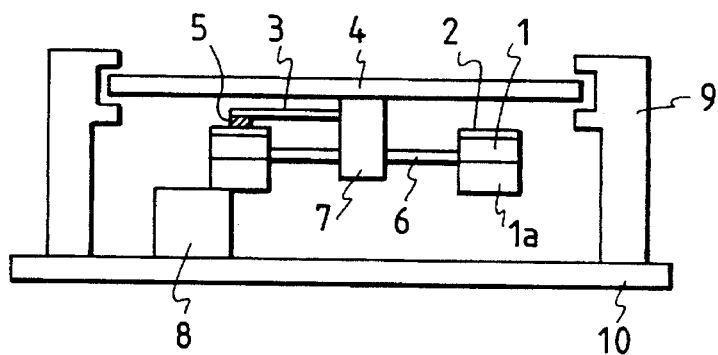
FIG. 7 is a sectional view showing a conventional vibration wave driven linear motor.
Figure 8:
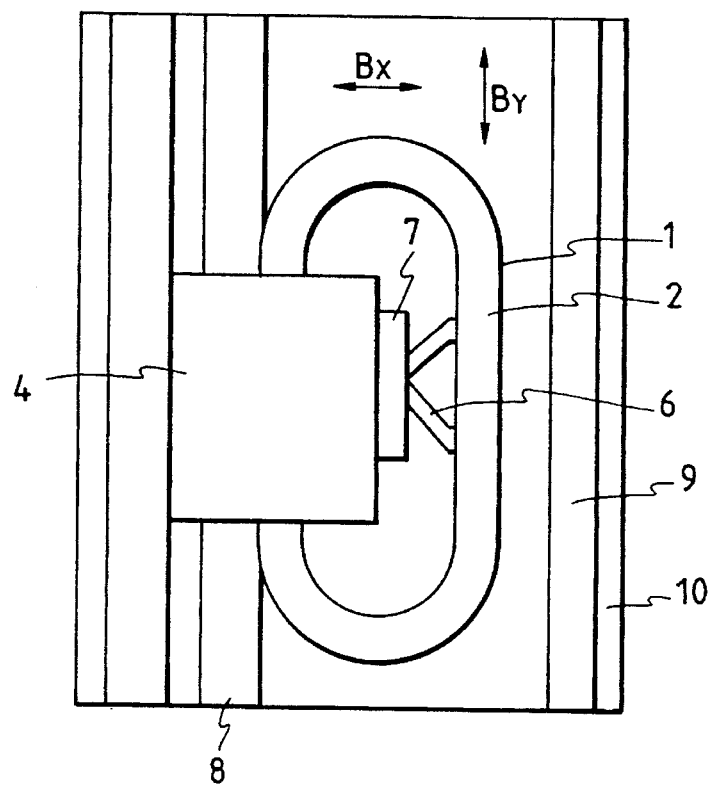
FIG. 8 is a plan view of FIG. 7.
Figure 9:
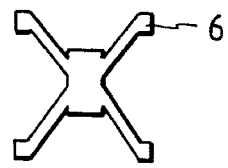
FIG. 9 is a plan view showing a vibration member support plate shown in FIG. 7.

In a vibration member of a vibration wave driven linear motor used in this embodiment, as in the prior art shown in FIGS. 7 and 8, a piezoelectric element 2 as an electromechanical energy converting element is joined by a known method to one surface of an elliptic elastic member 1, and a large number of interdigital projections (1AA) separately project from the driving surface side, opposite to the piezoelectric element 2, of the elastic member 1 along the travelling direction of a travelling wave. A sheet-like wear resistant member 18 is adhered by, e.g., an epoxy-based adhesive, to the distal end of each projection.

Figure 6:
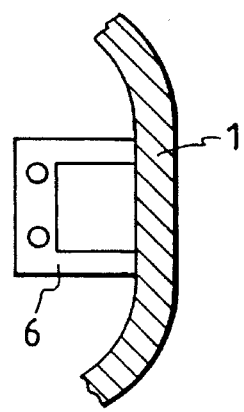
FIG. 6 is a plan view showing a mounting structure of a vibration member in the first embodiment.

A pair of distal end portions of a support plate 6, which has a U shape when it is viewed from the top, as shown in FIG. 6, are joined to a linear portion, on the sliding surface side, of the elastic member 1 by joining means such as spot welding. The extending end portion of a support member 7, which extends to the left (in FIG. 2A) from a base 4, located on the right side (FIG. 2A) of the support plate 6, of a print head of a printer is attached to the support plate 6, thus integrally assembling the base 4 and the vibration member 1.

A compression leaf spring or pressing member 3 is attached between the base 4 and the elastic member 1, as shown in FIG. 2B, and the biasing force of the compression spring 3 presses a linear driving portion to be driven of the elastic member 1 against a flange portion 8A constituting a rail portion of a rail-shaped stator 8 (to be described later) via a vibration insulating member 5 (width 4 mm×length 20 mm×thickness 1 mm) such as felt and a compression plate 19 (width 4 mm×length 20 mm) such as a stainless steel plate, which are inserted between the distal end portion of the compression spring 3 and the elastic member 1.

The rail-shaped stator or contact member 8 of this embodiment is formed with the flange portion, or the contact portion of the contact member, 8A, which has a proper elasticity since the linear portion of the elastic member 1 contacts it, and a flange or first guide portion 8B which opposes the flange portion 8A, and has a higher rigidity than that of the flange portion 8A.

Shaft rod support plates 13a and 13b are attached to the lower surface of the rail-shaped stator 8 at accurate positions by, e.g., positioning pins (not shown), so that they are attached to a reference surface. The support plates 13a and 13b support a shaft rod or second guide portion 11 so that it is parallel to the flange 8B of the rail-shaped stator 8. The shaft rod 11 is fixed to the shaft rod support plates 13a and 13b by shaft rod fixing members (not shown) forming a guide member, so as not to be shifted in the thrust direction.

Two members project to the left (in FIG. 2A) from the base 4 at positions shifted along the travelling direction, and sliding bearings or sliding members 12a and 12b (not shown) consisting of a resin or an oil-containing metal are attached to these two projecting members. Thus, the base 4 is engaged with the shaft rod 11 without cluttering so as to be movable in a direction of an arrow A in FIG. 1, and to be rotatable about the shaft rod 11 as the central axis.

On the other hand, two shaft rods 15a and 15b are attached to the base 4 at respective positions displaced along the travelling direction. Roller bearings or rotating members 14a and 14b are rotatably attached to the distal ends of these shaft rods 15a and 15b, so as to receive a counterforce produced with pressing the elastic member 1 by the spring 3 via the base 4 and the shaft rods 15a and 15b.

Note that a center L (FIG. 2A) of each of the roller bearings 14a and 14b is designed to coincide with the center of the pressing force acting on a contact portion of the elastic member 1, so that a total compression counterforce acting on the elastic member 1 is received by the roller bearings having a small coefficient of friction, and no moment components of this compression force are generated on the sliding bearings, thereby reducing the moving resistance of the base as much as possible.

When a high-frequency electric field (voltage) is applied from a power supply (not shown) to the piezoelectric element 2, a travelling vibration wave is excited in the elastic member 1 by a known method, and the elastic member 1, the base 4, and the associated members (3, 5, 6, 7, 12a, 12b, 14a, 14b, 15a, 15b, 16, 18, 19) attached to the base 4 are moved in the direction of the arrow A by a frictional force between the elastic member 1 and the rail-shaped stator 8 along the flange 8B provided on the rail-shaped stator 8 and the shaft rod 11 attached to the rail-shaped stator 8.

At this time, since the roller bearings 14a and 14b are pressed against the flange 8B of the rail-shaped stator 8 by the compression counterforce of the elastic member 1, and roll along the flange 8B, the degree of freedom of rotation, about the shaft rod 11, of the base 4 is restricted. Therefore, the degree of freedom of movement of the base 4 other than in the direction of the arrow A as a prospective moving direction of the base 4 is restricted, and the base 4 can be smoothly moved in the direction of the arrow A.

A position sensor (not shown; e.g., a photointerrupter) is provided on base 4. The position sensor detects the position and speed of the base 4 via a slit plate 17 which is attached to the shaft rod support plates 13a and 13b, and is given with a proper tension by, e.g., a leaf spring (not shown), and feeds back the detection signal to a control circuit (not shown) so as to execute speed control and stop position control of the base 4.

Figure 3:
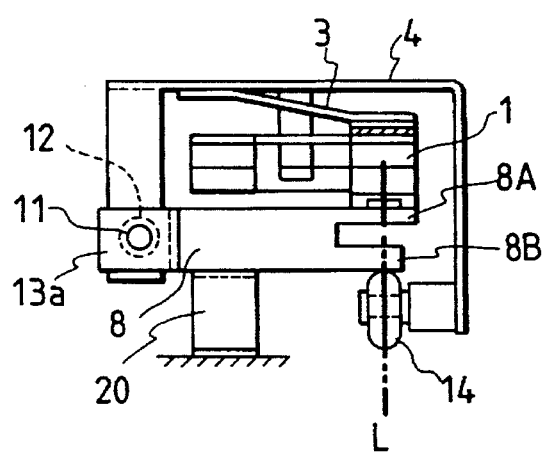
FIG. 3 is a sectional view showing a second embodiment.

FIG. 3 is a sectional view showing the second embodiment of the present invention.

In the first embodiment, the rail-shaped stator 8 has a substantially G-shaped cross-section, and the inner surfaces of the opposing flanges 8A and 8B are used as the sliding surface of the elastic member, and the rolling surface of the roller bearings. However, in this embodiment, the rail-shaped stator 8 is formed to have a U-shaped section with a recessed groove in one side portion, and the elastic member 1 and roller bearings 14a and 14b sandwich the outer surfaces of the two opposing flanges 8A and 8B which define the recessed groove.

The shaft rod support plates 13a and 13b are attached to the other side of the rail-shaped stator 8, and the shaft rod 11 is attached to the two ends of the support plates 13a and 13b while being engaged with sliding bearings 12a and 12b of the base 4.

The rail-shaped stator 8 is fixed to a rail support plate 20, located under the stator 8, by, e.g., screws. When this motor unit is attached to, e.g., an external attachment base, it is arranged via the rail support plate 20.

In this structure, since the outer flange surfaces of the rail-shaped stator 8 are used as the sliding surface with the elastic member 1 and the rolling surface of the roller bearings 14a and 14b, these surfaces can be lapped, thus improving the surface precision of the sliding surface.

Figure 4:
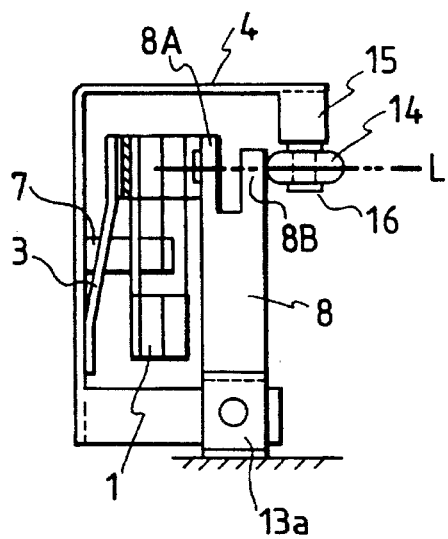
FIG. 4 is a sectional view showing a third embodiment.

FIG. 4 shows the third embodiment of the present invention. In this embodiment, the shaft rod support plates 13a and 13b in FIG. 3 are also used as rail support members corresponding to the rail support plate 20 in FIG. 3.

Figure 5:
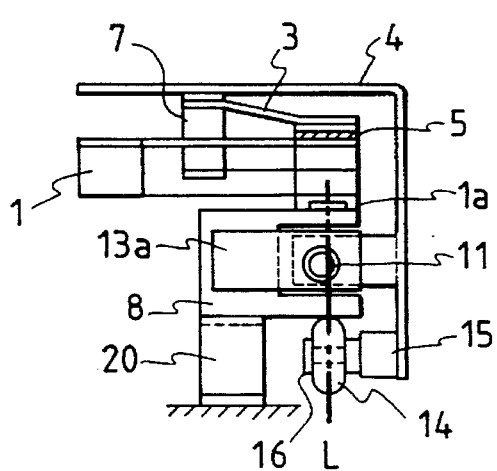
FIG. 5 is a sectional view showing a fourth embodiment.

FIG. 5 shows the fourth embodiment of the present invention. In this embodiment, the sliding shaft rod 11 is arranged inside two flanges 8A and 8B of the rail-shaped stator 8 which has a U-shaped cross-section, thus reducing the total width of the motor unit.

The vibration wave driven linear motor in each of the above embodiments can be used in a printer, in such a manner that a carriage is fixed to the base, and a print head in, e.g., a bubble-jet printer is mounted on the carriage.

As described above, according to each of the above embodiments, a constant compression force of the vibration member can be maintained without being influenced by a warp of the bottom plate or the rail, and the contact state between the vibration member and the rail-shaped stator can be prevented from locally changing depending on the position in the moving direction, thus obtaining a stable motor output.

The structure is designed not to apply the compression counterforce of the vibration member on a first member to be restricted, which comprises a sliding bearing and a sliding shaft rod inserted in the sliding bearing, and a first restricting member, thereby eliminating a bearing loss of the motor, and improving performance of the motor.

Figure 10:
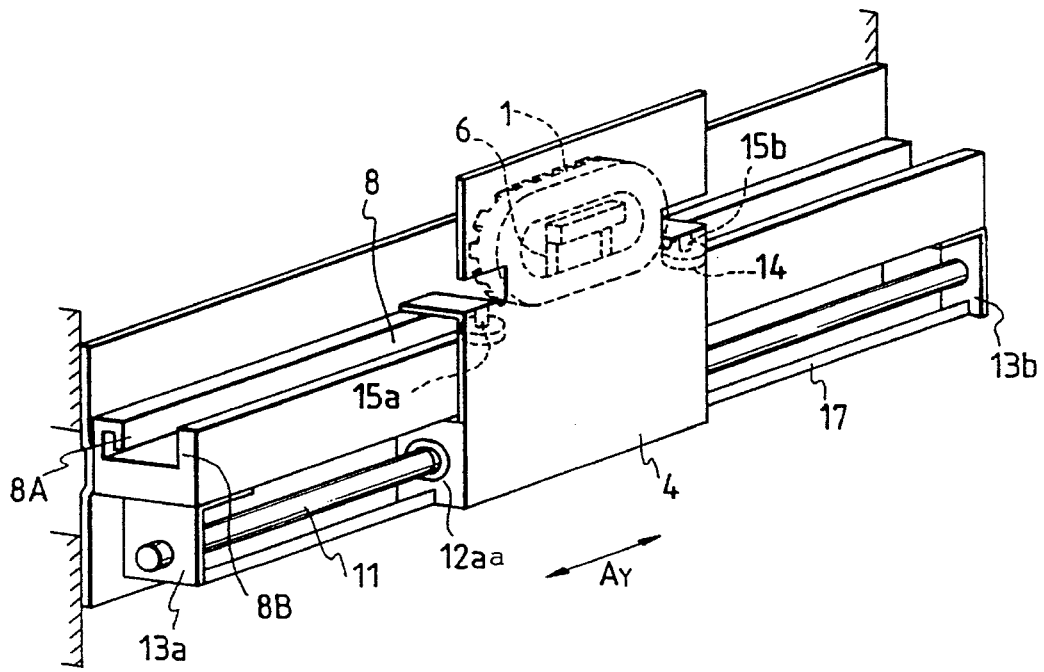
FIG. 10 is a perspective view showing a fifth embodiment of a vibration wave driven linear motor according to the present invention.
Figure 11A:
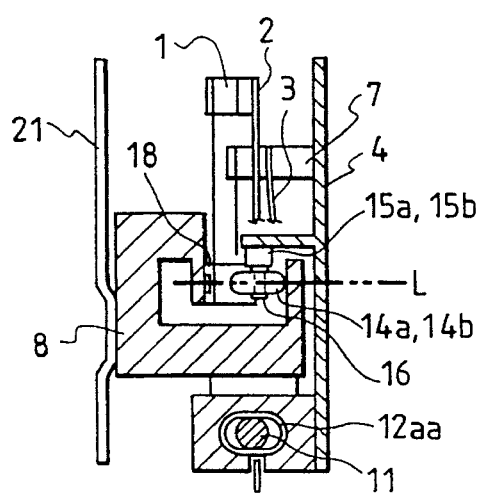
Figure 11B:
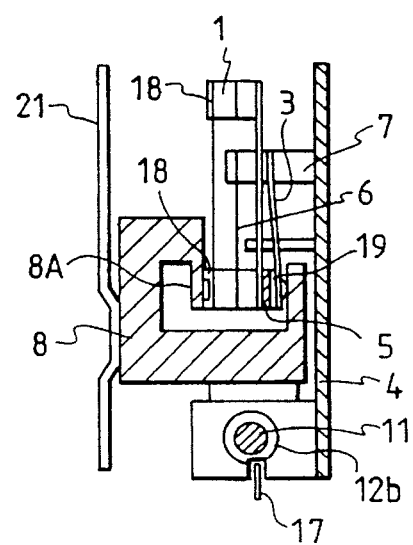
Figure 12:
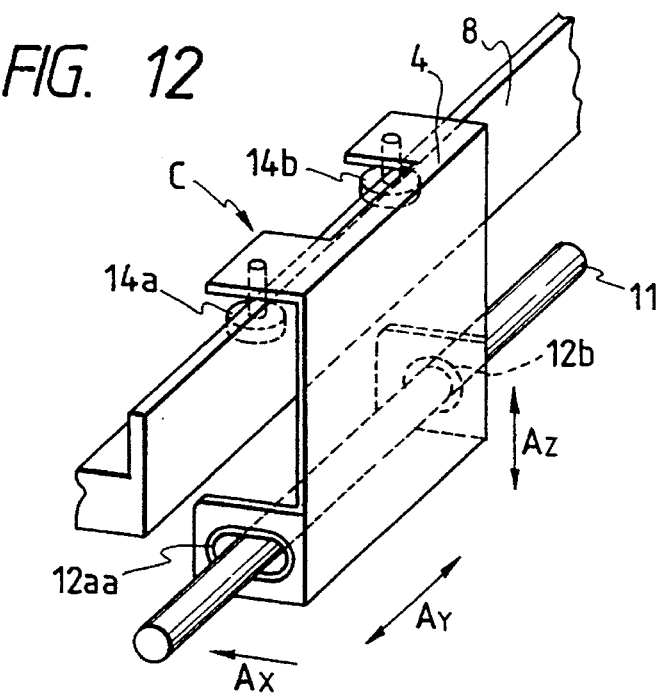
FIG. 12 is a perspective view showing a main part of FIG. 10.
Figure 13A:
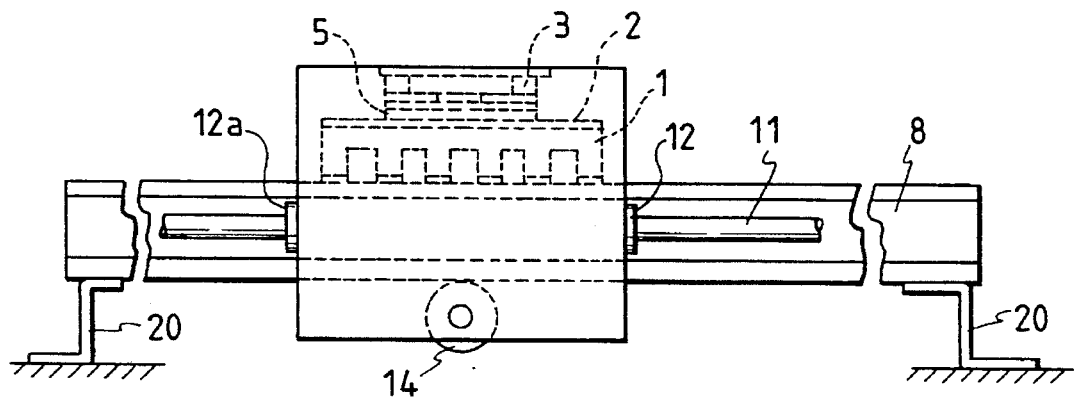
Figure 13B:
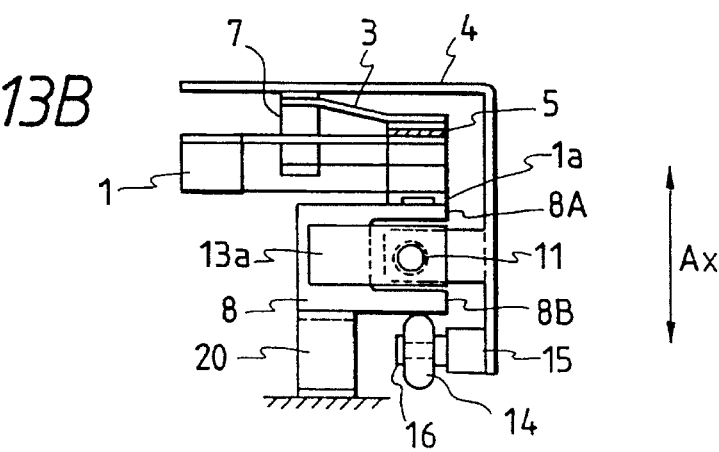

FIGS. 10 to 12 are respectively a perspective view of a bubble-jet printer according to the fifth embodiment of the present invention, sectional views of FIG. 10, and a perspective view of main part in FIG. 10. FIGS. 13A and 13B are respectively a perspective view and a sectional view of a printer according to the sixth embodiment. Since these embodiments are substantially the same as the first embodiment shown in FIG. 1, only differences will be described below.

FIGS. 10 to 13B show embodiments wherein the compression direction with respect to an elastic member 1 forming a vibration member is restricted at three points rather than at four points. In the embodiment shown in FIGS. 10 to 12, the above-mentioned restriction (in the direction of an arrow Ax in FIG. 12) is attained by three members, i.e., two roller bearings 14a and 14b and a single circular sliding bearing 12b (see FIG. 11B). In the embodiment shown in FIGS. 13A and 13B, the above-mentioned restriction (in the direction of an arrow Ax in FIG. 13B) is attained by a single roller bearing 14 and two circular sliding bearings 12a and 12b.

Note that an elongated hole 12aa in FIGS. 10 to 12 is formed to allow a base 4, which carries a print head (not shown) to able to be inclined in its longitudinal direction.

In each of the above embodiments, the bearing 12 comprises a sliding bearing, but may comprise a linear ball bearing, and the roller bearing 14 may comprise a radial ball bearing.

In summary, since the rail 8 as a contact member also serves as a guide for the elastic member 1 as a vibration member, a high-precision motor can be obtained at low cost.

What is claimed is:

1. A vibration driven motor or actuator, comprising:

a vibration member for generating a vibration thereon, said vibration member having a contact portion;

a contact member having a contact portion in frictional contact with the contact portion of said vibration member and having a first guide portion;

a guide member having a second guide portion;

a pressing member for applying a pressure between said vibration member and said contact member;

a rotating member for contacting the first guide portion, said rotating member being rotated by a relative movement between said vibration member and said contact member and for receiving a counterforce of said pressure applied by said pressing member; and a sliding member for sliding on the second guide portion.

2. A motor or actuator according to claim 1, wherein said rotating member is arranged between the contact portion of said contact member and the first guide portion.

3. A motor or actuator according to claim 1, wherein said vibration member is moved relative to said contact member by said vibration.

4. A motor or actuator according to claim 3 further comprising:

a moving member movable by a movement of said vibration member, said moving member supporting said sliding member.

5. A system comprising a vibration motor or actuator, said motor or actuator comprising:

a vibration member for generating a vibration thereon, said vibration member having a contact portion;

a contact member having a contact portion in frictional contact with the contact portion of said vibration member and having a first guide portion;

a guide member having a second guide portion;

a pressing member for applying a pressure between said vibration member and said contact member;

a rotating member for contacting the first guide portion, said rotating member being rotated by a relative movement between said vibration member and said contact member and for receiving a counterforce of said pressure applied by said pressing member; and a sliding member for sliding on the second guide portion.

6. A vibration driven motor or actuator, comprising:

a vibration member for generating a vibration thereon, said vibration member having a contact portion;

a contact member having a contact portion in frictional contact with said contact portion of said vibration member, and having a guide portion;

a pressing member for applying a pressure between said vibration member and said contact member; and a rotating member for contacting said guide portion, said rotating member being rotated by a relative movement between said vibration member and said contact member and for receiving a counterforce of the pressure applied by said pressing member, wherein said guide portion and said rotating member are arranged so that a center of said rotating member is on a line extending perpendicular to a center of the contact between said contact portion of said vibration member and said contact portion of said contact member.

7. A motor or actuator according to claim 6, wherein said rotating member is arranged between said contact portion of said contact member and said guide portion.

8. A motor or actuator according to claim 6, wherein said guide portion is arranged between said contact portion of said contact member and said rotating member.

9. A system comprising a vibration driven motor or actuator, said motor or actuator comprising:

a vibration member for generating a vibration thereon, said vibration member having a contact portion;

a contact member having a contact portion in frictional contact with said contact portion of said vibration member, and having a guide portion;

a pressing member for applying a pressure between said vibration member and said contact member; and a rotating member for contacting said guide portion, said rotating member being rotated by a relative movement between said vibration member and said contact member and for receiving a counterforce of the pressure applied by said pressing member, wherein said guide portion and said rotating member are arranged so that a center of said rotating member is on a line extending perpendicular to a center of the contact between said contact portion of said vibration member and said contact portion of said contact member.

* * * * *